(12) United States Patent
Ryoo et al.

(10) Patent No.: US 12,378,397 B2
(45) Date of Patent: Aug. 5, 2025

(54) PLASTICIZER COMPOSITION AND VINYLCHLORIDE RESIN COMPOSITION COMPRISING THE SAME

(71) Applicant: HANWHA SOLUTIONS CORPORATION, Seoul (KR)

(72) Inventors: Sungmin Ryoo, Daejeon (KR); Jaesong Kim, Daejeon (KR); Yeo Jin Kim, Daejeon (KR); Yeonran Shin, Daejeon (KR); Taeyoung Jang, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 637 days.

(21) Appl. No.: 17/642,241

(22) PCT Filed: Sep. 15, 2020

(86) PCT No.: PCT/KR2020/012428
§ 371 (c)(1),
(2) Date: Mar. 11, 2022

(87) PCT Pub. No.: WO2021/054695
PCT Pub. Date: Mar. 25, 2021

(65) Prior Publication Data
US 2022/0315750 A1    Oct. 6, 2022

(30) Foreign Application Priority Data
Sep. 16, 2019   (KR) .................. 10-2019-0113455

(51) Int. Cl.
*C08L 27/06* (2006.01)
*C08K 5/11* (2006.01)
*C08K 5/12* (2006.01)
*C08L 67/02* (2006.01)

(52) U.S. Cl.
CPC .............. *C08L 27/06* (2013.01); *C08L 67/02* (2013.01)

(58) Field of Classification Search
CPC ......... C08L 27/06; C08K 5/0016; C08K 5/10; C08K 5/11; C08K 5/12
See application file for complete search history.

(56) References Cited

U.S. PATENT DOCUMENTS

| 9,388,293 B2 | 7/2016 | Olsen | |
|---|---|---|---|
| 2012/0071598 A1 | 3/2012 | Gosse | |
| 2013/0137789 A1* | 5/2013 | Olsen | C08K 5/12 524/114 |
| 2020/0093690 A1* | 3/2020 | Sandford | A61J 1/10 |

FOREIGN PATENT DOCUMENTS

| CN | 107075218 A | 8/2017 | |
|---|---|---|---|
| CN | 107428989 A | 12/2017 | |
| CN | 109134926 A * | 1/2019 | ............... C08K 5/00 |
| EP | 3255086 A1 * | 12/2017 | ............... C08K 3/00 |
| EP | 3502175 A | 6/2019 | |
| GB | 2601454 A | 6/2022 | |
| JP | 2013522293 A | 6/2013 | |
| KR | 1020080105341 A | 12/2008 | |
| KR | 20120083560 A | 7/2012 | |
| KR | 101264148 B1 | 5/2013 | |
| KR | 1020160047221 A | 5/2016 | |
| KR | 1020160134573 A | 11/2016 | |
| KR | 20170121060 A | 11/2017 | |
| KR | 1020180028034 A | 3/2018 | |
| KR | 101845338 B1 | 4/2018 | |
| KR | 101889540 B1 | 8/2018 | |
| KR | 1020190024936 A | 3/2019 | |
| WO | 2015124236 A1 | 8/2015 | |

OTHER PUBLICATIONS

Machine translation of CN-109134926-A (no date).*
Non-phthalate plasticizers in German daycarecenters and human biomonitoring of DINCHmetabolites in children attending the centers (LUPE3) published Aug. 7, 2015.
Office Action dated Apr. 22, 2022, of the corresponding Indian Patent Application No. 202247017971.

* cited by examiner

*Primary Examiner* — Michael J Feely
(74) *Attorney, Agent, or Firm* — Harvest IP Law, LLP

(57) ABSTRACT

This invention relates to a plasticizer composition that is environment-friendly, exhibits rapid gelling speed, thus improving processability, can give low viscosity of plastisol required for wallpaper and flooring, exhibits low heating loss, has small viscosity change over time, and has excellent migration resistance, and a vinylchloride resin composition comprising the same.

13 Claims, No Drawings

PLASTICIZER COMPOSITION AND VINYLCHLORIDE RESIN COMPOSITION COMPRISING THE SAME

CROSS-REFERENCE TO RELATED APPLICATION(S)

This application is a National Stage of International Application No. PCT/KR2020/012428 filed Sep. 15, 2020, claiming priority based on Korean Patent Application No. 10-2019-0113455 filed on Sep. 16, 2019 with the Korean Intellectual Property Office, the disclosures of which are herein incorporated by reference in their entirety.

This invention relates to a plasticizer composition that is environment-friendly, exhibits rapid gelling speed, thus improving processability, can give low viscosity property of plastisol required for wallpaper and flooring, exhibits low heating loss, has small viscosity change over time of plastisol, and has excellent migration resistance, and a vinylchloride resin composition comprising the same.

TECHNICAL FIELD

Background Art

Vinylchloride resin is homopolymer of vinylchloride or copolymer containing 50% or more of vinylchloride, and is one of commercial thermal plastic resin prepared by suspension polymerization and emulsion polymerization. Polyvinylchloride resin prepared by suspension polymerization and emulsion polymerization is processed in the form of plastisol, granules, or pellet, by mixing one or more of a plasticizer, a stabilizer, a filler, a blowing agent, a pigment, a viscosity depressant, titanium dioxide ($TiO_2$), a diluent, a dispersant and other supplementary materials, and is used in various fields such as flooring, wallpaper, tarpaulin, artificial leather, toy, coating material of the lower part of automobiles, and the like through coating molding, extrusion molding, injection molding, or calendar molding.

Particularly, interior products such as wallpaper or flooring, and the like are exposed most in residential and office spaces, and 60% or more of them are prepared using vinylchloride resin. Recently, a main issue of wallpaper and flooring relates to environmental products, and environment friendliness is determined by HB grades (three steps of best, excellent, good) ranked according to the amount of discharge of volatile organic compounds (VOCs) implemented by Air Cleaning Association, and whether or not containing a phthalate-based plasticizer (DEHP, BBP, DBP, DINP, and the like) regarded as suspected endocrine disrupter and carcinogen in the country.

In the vinylchloride resin composition for wallpaper and flooring, a plasticizer is liquid additive occupying the highest content, and as examples of the plasticizer, phthalate-based products such as DEHP (di-2-ethylhexyl phthalate), DNOP (di-n-octyl phthalate), DINP (di-isononyl phthalate), DIDP (di-iso-decyl phthalate), BBP (butyl benzyl phthalate), DBP (di-n-butyl phthalate), or DIBP (di-iso-butyl phthalate) may be mentioned, and particularly, DEHP and DINP have been widely used. However, phthalate-based plasticizers are suspected of an endocrine disrupter interrupting or disturbing hormonal action of human body and a carcinogen, and thus, regulations on the use of phthalate-based plasticizers are being strengthened.

Thus, recently, cases of using non-phthalate-based plasticizers such as terephthalate-based plasticizers, polymer plasticizers, benzoate-based plasticizers, and the like, instead of phthalate-based plasticizers, are being reported.

For example, Korean Laid-Open Patent Publication No. 2008-0105341 discloses using DOTP (dioctyl terephthalate (or also referred to as DEHTP (di(2-ethylhexyl) terephthalate)) alone, or DOTP and DINP (di-isononyl phthalate) in combination as a terephthalate-based plasticizer. Since the DOTP is not a phthalate-based plasticizer, it may be free from environmental dispute, but compared to the existing phthalate-based plasticizers, it has low plasticization efficiency, slow gelling speed, has high melting point and the resulting inferior processability, has bad compatibility with additives previously used as raw materials (stabilizer, viscosity depressant), and has inferior migration, and when producing wallpaper products, many problems such as deterioration of foaming property, rapid viscosity increase of a vinylchloride resin composition, particularly plastisol in winter season, are being found.

In order to compensate such inferior properties of terephthalate-based plasticizers such as DOTP, Korean Registered Patent No. 1845338 discloses using a citrate-based plasticizer having excellent gelling speed and migration resistance, such as TBC (Tributyl citrate), ATBC (Acetyl tributyl citrate), in combination with the DOTP.

However, in the mixture of DOTP and citrate-based plasticizer, if the rate of the citrate-based plasticizer is increased so as to improve properties and processability, a change of plastisol over time may increase, and thus, there is a limitation in property improvement. And, as the rate of the citrate-based plasticizer increases, heating loss increases, and thus, there is serious loss of plasticizer due to volatilization during processing, thus deteriorating properties of the final product, and the amount of fume generation may increase during the production of products, thus worsening working environment.

Meanwhile, besides the DOTP, DEHCH (di(2-ethylhexyl) cyclohexane-1,4-dicarboxylate) may be used as a non-phthalate-based plasticizer. The DEHCH has low viscosities at room temperature and low temperature, and thus, can realize excellent coating property in the field of wallpaper and flooring, has rapid gelling speed, has excellent foaming property, and particularly, it does not cause environmental problems like phthalate-based plasticizers, and thus, is highly favored as a plasticizer of vinylchloride resin. However, despite such advantages, since DEHCH has paper migration similar to the existing environment-friendly plasticizers, use in domestic wallpaper market preparing wallpaper by coating sol on the paper is limited to a certain degree.

Migration of plasticizer means outflow of a part of a plasticizer mixed with polymer resin out of the polymer resin. In the case of some plasticizers (mainly phthalate), if the outflowed plasticizer inflows in human body, it may disturb normal action of endocrine system directly involved in activity of life or trigger abnormal reactions, or may inflict fatal injury, and thus, there is a need to suppress migration of the plasticizer to the maximum. It is an important cause of limiting the use of phthalate-based plasticizers in flooring, wallpaper, tarpaulin, artificial leather, toy, coating material of the lower part of automobiles, and the like, which have high degree of contact with human, and thus, are most likely to be exposed to human body. And, if the plasticizer migrates out of products, the content of plasticizer in the product may decrease and properties may be deteriorated, and thus, migration property in the plasticizer should be necessarily considered for product property maintenance and human body stability. Since it is greatly influenced by compatibility between a plasticizer and vinylchloride resin and physical/chemical properties of a plasticizer, it is difficult to expect. Thus, in case various novel plasticizers are applied, migration resistance should be necessarily tested.

As a method for improving migration resistance of a mixed plasticizer of a terephthalate-based compound and a citrate-based compound, Korean Laid-Open Patent Publication No. 2016-0047221 discloses a plasticizer composition comprising DEHCH and a citrate-based compound. However, the plasticizer composition has a limitation in property improvement, due to bad smell and high sol viscosity of the citrate-based compound, and inferior volatilization of the cyclohexane dicarboxylate-based compound.

PRIOR ART DOCUMENT

Patent Document (Patent Document 1) Korean Laid-Open Patent Publication No. 2008-0105341 (published on 2008 Dec. 4)
(Patent Document 2) Korean Registered Patent No. 1845338 (Registered on 2018 Mar. 29)
(Patent Document 3) Korean Laid-Open Patent Publication No. 2016-0047221 (published on 2016 May 2)

DETAILED DESCRIPTION OF THE INVENTION

Technical Problem

In order to solve the above problems, it is an object of the invention to provide an environment-friendly plasticizer composition prepared by additionally adding a cyclohexane dicarboxylate-based compound to a mixture of a terephthalate-based compound and a citrate-based compound of specific structures.

It is another object of the invention to provide a plasticizer composition that exhibits rapid gelling speed, thus improving processability of a vinylchloride resin composition, can realize low viscosity and decreased rate of viscosity change over time of plastisol required for wallpaper and flooring, and exhibits low heating loss and excellent migration resistance, through the control of the mixing ratio of the terephthalate-based compound, citrate-based compound, and cyclohexane dicarboxylate-based compound.

It is still another object of the invention to provide a vinylchloride resin composition comprising the plasticizer composition.

It is still another object of the invention to provide a molded article comprising the vinylchloride resin composition.

Technical Solution

In order to achieve the objects, one aspect of the invention provides a plasticizer composition comprising, based on 100 parts by weight of the plasticizer composition,
  35 to 50 parts by weight of a terephthalate-based compound represented by the following Chemical Formula 1,
  30 to 55 parts by weight of a cyclohexane dicarboxylate-based compound represented by the following Chemical Formula 2, and
  8 to 20 parts by weight of a citrate-based compound represented by the following Chemical Formula 3,
  wherein the weight ratio of the citrate-based compound to the terephthalate-based compound is 0.2 to 0.4:

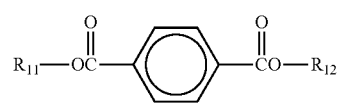

[Chemical Formula 1]

in the Chemical Formula 1,
$R_{11}$ and $R_{12}$ are identical to each other, and C4-10 alkyl,

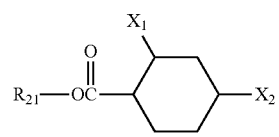

[Chemical Formula 2]

in the Chemical Formula 2,
$X_1$ and $X_2$ are each independently, hydrogen or $-C(=O)O-R_{22}$, provided that both $X_1$ and $X_2$ are not hydrogen, and $R_{21}$ and $R_{22}$ are identical to each other, and C4-10 alkyl,

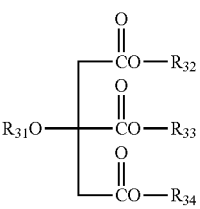

[Chemical Formula 3]

in the Chemical Formula 3,
$R_{31}$ is hydrogen or acetyl,
$R_{32}$ to $R_{34}$ are each independently, C4-10 alkyl.

Another aspect of the invention provides a vinylchloride resin composition comprising vinylchloride resin and the plasticizer composition.

Still another aspect of the invention provides a molded article comprising the vinylchloride resin composition.

Advantageous Effects

The plasticizer composition according to the invention is an environment-friendly composition comprising a terephthalate-based compound, a cyclohexane dicarboxylate-based compound and a citrate-based compound of specific structures, and through the control of the content ratio of the compounds, rapid gelling speed can be provided, thus improving processability of a vinylchloride resin composition. And, the plasticizer composition can realize low viscosity and decreased viscosity change rate over time of plastisol required for wallpaper and flooring, and exhibit low heating loss and excellent migration resistance. Particularly, due to low heating loss of the plasticizer composition, loss of plasticizers by volatilization during processing may decrease, thus preventing processability deterioration, and due to decrease in the amount of fume generated during the process, improved processability may be exhibited.

Thus, a vinylchloride resin composition comprising the plasticizer composition of the invention can be used for a wallpaper, flooring, mat, tarpaulin, sealant, artificial leather, toy, coating material of the lower part of automobiles, and the like, and particularly, can be usefully used for wallpaper, flooring, and the like because it is environment-friendly, has low viscosity property of plastisol and small viscosity change over time of plastisol, and has low heating loss.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, a plasticizer composition, a vinylchloride resin composition comprising the same, and a molded article comprising the same according to specific embodiments of the invention will be explained in detail.

Plasticizer Composition

The plasticizer composition of the invention is based on the discovery that due to interactions of specific three kinds of plasticizers, gelling speed may be improved, low viscosity and decreased viscosity change over time of plastisol may be realized, and excellent migration resistance and low heating loss may be exhibited.

Specifically, the plasticizer composition according to one embodiment of the invention comprises, based on 100 parts by weight of the plasticizer composition,
  35 to 50 parts by weight of a terephthalate-based compound represented by the following Chemical Formula 1,
  30 to 55 parts by weight of a cyclohexane dicarboxylate-based compound represented by the following Chemical Formula 2, and
  8 to 20 parts by weight of a citrate-based compound represented by the following Chemical Formula 3,
  wherein the weight ratio of the citrate-based compound to the terephthalate-based compound is 0.2 to 0.4:

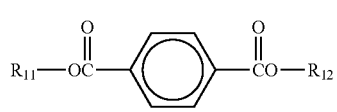

[Chemical Formula 1]

in the Chemical Formula 1,
$R_{11}$ and $R_{12}$ are identical to each other, and C4-10 alkyl,

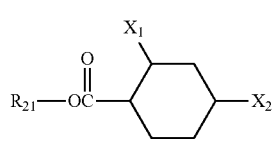

[Chemical Formula 2]

in the Chemical Formula 2,
$X_1$ and $X_2$ are each independently, hydrogen or —C(=O)O—$R_{22}$, provided that both $X_1$ and $X_2$ are not hydrogen, and $R_{21}$ and $R_{22}$ are identical to each other, and C4-10 alkyl,

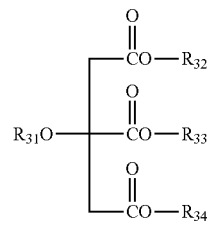

[Chemical Formula 3]

in the Chemical Formula 3,
$R_{31}$ is hydrogen or acetyl,
$R_{32}$ to $R_{34}$ are each independently, C4-10 alkyl.

In the plasticizer composition, the terephthalate-based compound represented by the Chemical Formula 1 is an environment-friendly plasticizer compound replacing the existing phthalate-based compounds, and when used in combination with a citrate-based compound, it can supplement high heating loss of the citrate-based compound, and decrease loss of a plasticizer composition due to volatilization during processing.

However, since it has low migration resistance and plasticization efficiency compared to the existing plasticizer compounds, in the present disclosure, in order to realize the effect of the plasticizer composition, it may be preferable that the terephthalate-based compound is included in the content of 35 to 50 parts by weight, based on 100 parts by weight of the plasticizer composition. If the content of the terephthalate-based compound is less than 35 parts by weight, based on 100 parts by weight of the plasticizer composition, the effect of decreasing heating loss may be inferior, and thus, loss of plasticizers may increase during processing, and there is a concern about worsening of heat resistance and increase in fume generation, and if the content of the terephthalate-based compound is greater than 50 parts by weight, based on 100 parts by weight of the plasticizer composition, there are concerns about deterioration of migration resistance, decrease in gelling speed, deterioration of foamability, and increase in the viscosity of plastisol. More preferably, by including the terephthalate-based compound in the content of 35 parts by weight or more, or 40 parts by weight or more, and 50 parts by weight or less or 45 parts by weight or less, based on 100 parts by weight of the plasticizer composition, heating loss property, and gelling speed, migration resistance and low viscosity of plastisol, which are in trade off relationship, may be improved with good balance.

The terephthalate-based compound may be a compound represented by the Chemical Formula 1, and more specifically, it may be a compound of the Chemical Formula 1 wherein $R_{11}$ and $R_{12}$ are identical to each other, and are C4-8 linear alkyl such as n-butyl, n-pentyl, and the like, or C6-10 branched alkyl such as ethylhexyl, isononyl, and the like.

As specific examples, dioctyl terephthalate (DOTP, or also named as DEHTP (di(2-ethylhexyl) terephthalate)), dibutyl terephthalate (DBTP), diisononyl terephthalate (DINTP), and the like may be mentioned, and one of them or mixtures there of may be used. Among them, dioctyl terephthalate or diisononyl terephthalate may be more preferable because they have excellent compatibility with the cyclohexane dicarboxylate-based compound and citrate-based compound and have small heating loss.

And, in the plasticizer composition, the cyclohexane dicarboxylate-based compound has low viscosity at room temperature and low temperature, and thus, can prevent increase in the viscosity and viscosity change rate over time of plastisol due to the use of the citrate-based compound, thereby realizing excellent coating property. And, it can improve gelling speed rapid, and improve foaming property of a vinylchloride resin composition.

However, the cyclohexane dicarboxylate-based compound has inferior heating loss property compared to the existing plasticizer compounds. If heating loss is high, the amount of plasticizers volatilized and lost during processing may increase, and heat resistance of a product may become inferior. Thus, in the present disclosure, in order to realize the effect of a plasticizer composition, it may be preferable that the cyclohexane dicarboxylate-based compound is included in the content of 30 to 55 parts by weight, based on 100 parts by weight of the plasticizer composition. If the content of the cyclohexane dicarboxylate-based compound is less than 30 parts by weight, based on 100 parts by weight of the plasticizer composition, viscosity and viscosity change rate over time of plastisol may significantly increase, and if the content is greater than 55 parts by weight, volatilization resistance may decrease. More preferably, by including the cyclohexane dicarboxylate-based compound in the content of 35 parts by weight or more, or 40 parts by weight or more, and 55 parts by weight or less, or 50 parts by weight or less, based on 100 parts by weight of the plasticizer composition, the viscosity and viscosity change rate over time of plastisol, and heating loss property, which are in trade-off relationship, may be improved with good balance.

The cyclohexane dicarboxylate-based compound may be specifically a compound represented by the following Chemical Formula 2-1 or 2-2.

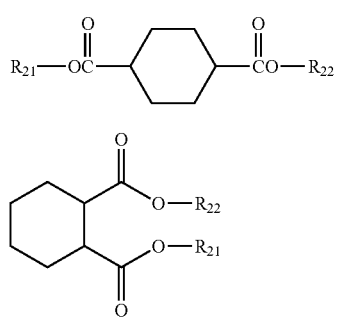

[Chemical Formula 2-1]

[Chemical Formula 2-2]

In the Chemical Formulas 2-1 and 2-2, $R_{21}$ and $R_{22}$ are as defined in the Chemical Formula 2

More specifically, the cyclohexane dicarboxylate-based compound may be compound of the Chemical Formula 2 wherein $R_{21}$ and $R_{22}$ are identical to each other, and are C4-8 linear alkyl such as n-butyl, or C6-10 branched alkyl such as ethylhexyl, isononyl, and the like.

As specific examples, di(2-ethylhexyl)cyclohexane-1,4-dicarboxylate ((DEHCH), or bis(2-ethylhexyl)cyclohexane-1,4-dicarboxylate), diisononyl cyclohexane-1,2-dicarboxylate (DINCH), di(2-ethylhexyl)cyclohexane-1,2-dicarboxylate (DOCH), or dibutyl cyclohexane-1,4-dicarboxylate (DBCH), and the like may be mentioned, and one of them or mixtures thereof may be used.

Among them, DEHCH has low viscosity at room temperature and low temperature, and thus, can realize excellent coating property, and has rapid gelling speed and excellent foaming property. And, since it can minimize generation of volatile organic compounds, compared to the existing phthalate-based plasticizers, DEHCH may be more preferable as the cyclohexane dicarboxylate-based compound in the present disclosure.

And, in the plasticizer composition, the citrate-based compound has excellent gelling speed property and migration resistance, and thus, when applied in a vinylchloride resin composition, properties and processability may be significantly improved.

However, the citrate-based compound has high heating loss, and high plastisol viscosity and very large viscosity change over time, compared to other plasticizer compounds. Thus, if included more than a certain amount, plasticizer loss due to volatilization during processing may increase, foaming property may be deteriorated, and viscosity and viscosity change rate over time of plastisol may increase, thus significantly deteriorating processability. Thus, in the present disclosure, in order to realize the effect of a plasticizer composition, it may be preferable that the citrate-based compound may be included in the content of 8 to 20 parts by weight, based on 100 parts by weight of the plasticizer composition. If the content of the citrate-based compound is less than 8 parts by weight, based on 100 parts by weight of the plasticizer composition, the effect of realizing low viscosity of plastisol and improving gelling speed may be insignificant, and migration resistance may be deteriorated, and if it is greater than 20 parts by weight, heating loss may significantly increase, foaming property may be deteriorated, and processability may be deteriorated due to increase in the viscosity of plastisol. More preferably, by including the citrate-based compound in the content of 8 parts by weight or more, or 10 parts by weight or more, and 20 parts by weight or less, or less than 15 parts by weight, or 13 parts by weight or less, based on 100 parts by weight of the plasticizer composition, gelling speed and migration resistance, and heating loss and foaming property, which are in trade-off relationship, may be improved with good balance.

The citrate-based compound is specifically a compound represented by the Chemical Formula 3, and more specifically, a compound of the Chemical Formula 3 wherein $R_{31}$ is hydrogen or acetyl, $R_{32}$ to $R_{34}$ are each independently, C4-8 linear alkyl such as n-butyl, and the like, or C6-10 branched alkyl such as isohexyl, ethylhexyl, isononyl, isodecyl, and the like.

The compound represented by the Chemical Formula 3 is a compound produced by esterification of citric acid and C4-10 alcohol, and the ester group in the compound interacts (for example, hydrogen bonding) with the ester group in the terephthalate-based compound to prevent the plasticizer from migrating out of a vinylchloride resin composition. Particularly, in case, in the Chemical Formula 2, $R_{12}$ to $R_{24}$ are each independently, butyl, octyl or nonyl, migration of a plasticizer may be more effectively inhibited, and gelling speed may be improved.

As specific examples, tributyl citrate (TBC), acetyl tributyl citrate (ATBC), triethylhexyl citrate (TEHC), acetyl triethylhexyl citrate (ATEHC), or triisononyl citrate (TINC), and the like may be mentioned, and one of them or mixtures thereof may be used.

As such, since the plasticizer composition according to one embodiment of the invention comprises a terephthalate-based compound, a cyclohexane dicarboxylate-based compound and a citrate-based compound of specific structures and the contents are controlled, the properties and effects of the plasticizer composition may be further improved with good balance through mutual supplementation between the compounds.

Particularly, as the content of the citrate-based compound is higher, gelling speed and migration resistance improvement effect may be enhanced, but since the citrate-based compound has high heating loss, when mixed more than a certain rate, plasticizer loss due to volatilization during processing may be high, thus deteriorating processability, and worsening working environment due to fume generation. And, the viscosity and viscosity change over time of plastisol may also increase significantly. For compensation, a terephthalate plasticizer having low heating loss is mixed, but when mixed more than a certain rate, migration resistance and gelling speed is deteriorated, and improvement in viscosity and viscosity change over time is not significant. Thus, in the present disclosure, by additionally adding a cyclohexane dicarboxylate-based compound, increase in the viscosity and viscosity change over time of plastisol due to the use of the terephthalate-based compound may be prevented.

Specifically, in the plasticizer composition according to one embodiment of the invention, the components are included in such an amount that the weight ratio of the citrate-based compound to the terephthalate-based compound is 0.2 or more and 0.4 or less, while meeting each content range. If the above weight ratio condition is met, the effect of improving gelling speed, migration resistance and heating loss may be excellent. If the weight ratio of the citrate-based compound to the terephthalate-based compound is less than 0.2, there is a concern about deterioration of gelling speed and migration resistance. More specifically, when the weight ratio of the citrate-based compound to the terephthalate-based compound is 0.2 or more, or 0.22 or more, and 0.38 or less, or 0.3 or less, or 0.29 or less, or 0.25 or less, the effects of increasing gelling speed, decreasing viscosity change rate over time, improving migration resistance and decreasing heating loss may be realized with good balance.

And, when the weight ratio of the terephthalate-based compound to the cyclohexane dicarboxylate-based compound (or the weight ratio of terephthalate-based compound/cyclohexane dicarboxylate-based compound) is 0.5 to 2, more specifically 0.5 or more, or 0.6 or more, and 2 or less, or 1.5 or less, and the weight ratio of the cyclohexane dicarboxylate-based compound to the citrate-based compound (weight ratio of cyclohexane dicarboxylate-based compound/citrate-based compound) is 1.5 to 5.5, more specifically 1.5 or more, or 3 or more, or 4 or more, and 5.5 or less, or 5 or less, the effects of increasing gelling speed, decreasing viscosity change rate over time, improving migration resistance and decreasing heating loss may be realized with good balance.

Moreover, the plasticizer composition according to the embodiment of the invention may further enhance the effects of the invention by optimizing the combination of constructional components as well as the above-described content requirements. Specifically, under conditions meeting the above-described content ranges and content ratio ranges, when DOTP is included as the terephthalate-based compound, DEHCH is included as the cyclohexane dicarboxylate-based compound, and TBC is included as the citrate-based compound, and the weight ratio of the citrate-based compound to the terephthalate-based compound is 0.2 or more, and 0.3 or less; further more, when the weight ratio of the terephthalate-based compound to the cyclohexane dicarboxylate-based compound is 0.6 or more and 1.5 or less, and the weight ratio of the cyclohexane dicarboxylate-based compound to the citrate-based compound is 4 or more and 5.5 or less, the effects of increasing gelling speed, decreasing viscosity change rate over time, improving migration resistance and decreasing heating loss may be realized with good balance.

According to another embodiment of the invention, the plasticizer composition does not comprise plasticizer compounds other than the above explained DOTP, DEHCH and TBC. Namely, the plasticizer composition may consist only of DOTP, DEHCH and TBC.

The plasticizer composition according to the embodiment of the invention may exhibit low viscosity property of plastisol and optimum gelling speed compared to the prior art, thus exhibiting improved processability and excellent migration resistance, and when used in a resin composition for wallpaper or flooring, it can decrease the amount of liquid additives such as viscosity depressant used, thus further improving migration property of the resin composition.

And, since the plasticizer composition has low volatilization amount, i.e., heating loss, when applied in a vinylchloride resin composition, there is no concern about deterioration of properties due to decrease in the plasticizer content by volatilization, and the amount of fume generated during the process may decrease, thus improving working environment.

Specifically, the plasticizer composition may have heating loss under 200° C. constant temperature condition for 1 hour, calculated by the following Mathematical Formula 1, of 3.2% or less, more specifically, 3.15% or less, or 3.0% or less, or 2.7% or less, or 2.5% or less, or 2.35% or less, or 2.3% or less, or 2.2% or less, or 2.1% or less.

Heating loss (%)=[(weight of initial plasticizer composition−weight of plasticizer composition after storage at 200° C. for 1 hour)/weight of initial plasticizer composition]×100     [Mathematical Formula 1]

Thus, the plasticizer composition may be used in resin compositions such as polyvinylchloride, polystyrene, polyurethane, polyethylene, polypropylene, modified silicon, ethylene vinylacetate resin and thermoplastic elastomer, and the like, and since it can give low viscosity of plastisol required for wallpaper and flooring, and has decreased heating loss, has small viscosity change over time, and yet, has excellent migration resistance, it may be particularly suitable for a vinylchloride resin composition.

Vinylchloride Resin Composition

According to another aspect of the invention, there is provided a vinylchloride resin composition, or plastisol comprising vinylchloride resin, and the above-described plasticizer composition.

More specifically, the vinylchloride resin composition may comprise the plasticizer composition in the amount of 30 to 200 parts by weight, or 40 to 70 parts by weight, or 50 to 70 parts by weight, based on 100 parts by weight of vinylchloride resin.

Since the vinylchloride resin composition comprises the plasticizer composition according to the invention, migration, gelling speed, and heating loss property of plasticizer may be further improved. As the vinylchloride resin, polyvinyl chloride (PVC) having a polymerization degree of 700 to 1,800 may be used, but is not limited thereto.

Throughout the specification, vinylchloride resin or polyvinylchloride refers to (co)polymer obtained by (co)polymerization of vinylchloride monomers alone, or vinylchloride monomers and comonomers copolymerizable therewith. Besides, a suspending agent, a buffering agent and a polymerization initiator, and the like may be mixed, and it may be prepared by suspension polymerization, micro-suspension polymerization, emulsion polymerization or mini-emulsion polymerization, and the like.

The monomers copolymerizable with the vinylchloride monomers may include, for example, vinylester monomers including ethylene vinyl acetate monomers and vinyl propionate monomers; olefin monomers including ethylene, propylene, isobutyl vinylether, and halogenated olefin; methacrylic acid ester monomers including methacrylic acid alkyl ester; maleic anhydride monomers; acrylonitrile monomers; styrene monomers; and halogenated polyvinylidene, and the like, and one of them or mixtures thereof may be mixed to prepare copolymer with vinylchloride monomers. However, the invention is not limited to the above-described monomers, and according to required properties or use of the vinylchloride resin composition, monomers commonly used in the art to form copolymer by polymerization with vinylchloride monomers may be used without specific limitations.

The vinylchloride resin composition may further comprise additives, for example, one or more selected from the group consisting of a stabilizer, a blowing agent, a filler ($CaCO_3$, $BaSO_4$) and titanium dioxide ($TiO_2$). The additives may be appropriately selected according to the properties to be improved in the vinylchloride resin composition.

The stabilizer is added to form a chromophore polyene structure by separation of HCl from the vinylchloride resin, thus causing crosslinking and preventing change of various properties, and may comprise one or more selected from the group consisting of a Ca—Zn-based compound, a K—Zn-based compound, a Na—Zn compound, a Ba—Zn-based compound, an organic Tin-based compound; a metallic soap-based compound, a phenol-based compound, a phosphate ester-based compound or a phosphorous ester-based compound. More specific examples of the stabilizer that can be used in the invention may include a Ca—Zn-based compound; a K—Zn-based compound; a Ba—Zn-based compound; a Na—Zn compound; an organic Tin-based compound such as a mercaptide-based compound, a maleic acid-based compound or a carboxylic acid-based compound; a metallic soap-based compound such as Mg-stearate, Ca-stearate, Pb-stearate, Cd-stearate, or Ba-stearate, and the like; a phenol-based compound; a phosphate ester-based compound; or a phosphorous ester-based compound, and the like, and they may be selectively included according to the purpose of use. In the present disclosure, it is preferable to use an environment-friendly complex organic compound stabilizer such as a K—Zn-based compound, a Ca—Zn-based compound, a Na—Zn compound, preferably K—Zn-based, Ca—Zn, Na—Zn-based, and the like.

The stabilizer may be preferably included in the content of 0.5 to 7 parts by weight, more preferably 1 to 4 parts by weight, based on 100 parts by weight of the vinylchloride resin. If the content of the stabilizer is less than 0.5 parts by weight, heat stability may be lowered, and if it is greater than 7 parts by weight, processability may be lowered.

The foaming agent used in the invention comprises one or more selected from a chemical blowing agent, a physical blowing agent, or a mixture thereof.

As the chemical blowing agent, compounds decomposed over a specific temperature to produce gas may be used without specific limitations, and azodicarbonamide, azodiisobutyro-nitrile, benzenesulfonhydrazide, 4,4-oxybenzene sulfonyl-semicarbazide, p-toluene sulfonyl semi-carbazide, bariumazodicarboxylate, N,N'-dimethyl-N,N'-dinitrosoterephthalamide, trihydrazino triazine, and the like may be exemplified. And, sodium bicarbonate, potassium bicarbonate, ammonium bicarbonate, sodium carbonate, ammonium carbonate, and the like may also be exemplified.

As the physical blowing agent, inorganic blowing agents such as carbon dioxide, nitrogen, argon, water, air, helium, and the like, organic blowing agents such as aliphatic hydrocarbon comprising 1 to 9 carbon atoms, aliphatic alcohol comprising 1 to 3 carbon atoms, halogenated aliphatic hydrocarbon comprising 1 to 4 carbon atoms, and the like, may be mentioned.

As specific examples of such compounds, aliphatic hydrocarbon such as methane, ethane, propane, normal butane, isobutane, normal pentane, isopentane, neopentane, and the like, aliphatic alcohol such as methanol, ethanol, normal propanol, isopropanol, and the like, halogenated aliphatic hydrocarbon such as methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), 1,1,2,2-tetrafluoromethane (HFC-134), 1,1,1,3,3-pentafluorobutane (HFC-365mfc), 1,1,1,3,3-pentafluoropropane (HFC.sub.13 245fa), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane, methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123), 1-chloro-1,2,2,2-tetrafluoroethane (HCFC-124), trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, dichlorohexafluoropropane, and the like may be mentioned. The content of the blowing agent may be preferably 0.5 to 5 parts by weight, based on 100 parts by weight of the vinylchloride resin, and if the content of the blowing agent is too small, the amount of generated gas for blowing may be too small, and thus, blowing effect may be insignificant or cannot be expected, and if it is too large, the amount of generated gas may be too large, and thus, it may be difficult to expect required properties.

The filler of the invention is used to improve productivity and dry touch of the vinylchloride resin composition, and includes one or more selected from the group consisting of calcium carbonate, talc, titanium dioxide, kaolin, silica, alumina, magnesium hydroxide or clay.

In the vinylchloride resin composition according to the invention, the filler may be preferably included in the content of 10 to 300 parts by weight, more preferably 50 to 130 parts by weight. If the content of the filler is less than 50 parts by weight, dimensional stability and economical efficiency may be lowered, and if it is greater than 300 parts by weight, blowing surface may be inferior, and processability may be lowered.

To the vinylchloride resin composition of the invention, titanium dioxide ($TiO_2$) may be added to improve whiteness and hiding property. The titanium dioxide may be preferably included in the content of 1 to 20 parts by weight, more preferably 3 to 15 parts by weight, based on 100 parts by weight of the vinylchloride resin. If the content of titanium dioxide is less than 3 parts by weight, whiteness and hiding property may be deteriorated, and thus, color may not be properly exhibited after printing, and if it is greater than 15 parts by weight, blowing surface may be deteriorated.

The vinlychloride resin composition of the invention may optionally further comprise a viscosity depressant or diluent for controlling sol viscosity and flowing property, and a dispersant for improving sol dispersibility, and specifically, may comprise one or more of them in the content of 0.3 to 50 parts by weight, based on 100 parts by weight of the resin composition.

The vinylchloride resin composition according to one embodiment of the invention may be prepared by a method generally known in the art, using vinylchloride resin, the above-described plasticizer composition, and optionally, additives, and the method is not specifically limited.

The vinylchloride resin composition may exhibit rapid gelling speed and improved processability, exhibit low viscosity of plastisol required for wallpaper and flooring, exhibit low heating loss, has small viscosity change over time of plastisol, and has excellent migration resistance.

The vinylchloride resin composition according to one embodiment of the invention may be specifically plastisol.

And, in the vinylchloride resin composition or plastisol, the plasticizer composition exhibits remarkably decreased heating loss of 3.2% or less, more specifically 3.15% or less, or 3.0% or less, or 2.7% or less, or 2.5% or less, or 2.35% or less, or 2.3% or less, or 2.2% or less, or 2.1% or less, said heating loss being calculated by the Mathematical Formula 1 when stored under 200° C. constant temperature condition for 1 hour. Thus, there is no concern about property deterioration due to decrease in plasticizer by volatilization, and the amount of fume generated during the process may decrease, thus improving working environment.

And, the vinylchloride resin composition or plastisol may have initial viscosity measured using a Brookfield viscometer (spindle #4, 20 RPM) after aging under 25° C. constant temperature condition for 1 hour, of 2000 to 4000 cps, more specifically 2000 cps or more, or 2500 cos or more, or 2550 cps or more, and 4000 cps or less, or 3800 cps or less, or 3500 cps or less, or 3200 cps or 3000 cps or less.

And, the vinylchloride resin composition or plastisol may have a rate of viscosity change over time, calculated by the following Mathematical Formula 2, of 1 to 1.55, more specifically 1 or more, or 1.2 or more, or 1.25 or more, or 1.3 or more, and 1.55 or less, or 1.53 or less, or 1.5 or less.

Rate of viscosity change over time after one day= viscosity after one day/initial viscosity   [Mathematical Formula 2]

(in the Mathematical Formula 2, the initial viscosity is viscosity measured using a Brookfield viscometer (spindle #4 and 20 RPM) after aging under 25° C. constant temperature condition for 1 hour, and the viscosity after one day is viscosity measured after one day has elapsed under the same conditions)

Due to such excellent properties, it may be used for flooring, wallpaper, mat, tarpaulin, sealant, artificial leather, toy, coating material of the lower part of automobiles, and particularly, it may be useful for flooring, wallpaper, mat, and the like.

Meanwhile, according to another aspect of the invention, there is provided a molded article comprising the above-described vinylchloride resin composition or plastisol.

The molded article may be prepared while additionally adding additives such as a stabilizer, a filler and/or a blowing agent to the vinylchloride resin composition according to the use.

The molded article may be used as wallpaper, flooring, mat, tarpaulin, hose, decosheet, sealant, artificial leather, toy, coating material of the lower part of automobile, and the like, and particularly, migration of a plasticizer is improved and low temperature property is good, compared to the environment-friendly plasticizer composition using DOTP, currently most commonly used in the market.

Hereinafter, the invention will be explained in more detail through the following examples. However, these examples are only to illustrate the invention, and the scope of the invention is not limited thereby.

Preparation of Plasticizer Composition and Vinylchloride Resin Composition

Example 1

As described in the following Table 1, based on 100 parts by weight of a plasticizer composition, 40 parts by weight of dioctyl terephthalate(di(2-ethylhexyl) terephthalate) (DOTP), 50 parts by weight of di(2-ethylhexyl)cyclohexane-1,4-dicarboxylate (DEHCH) and 10 parts by weight TBC (tributyl citrate) were mixed to prepare a plasticizer composition.

100 parts by weight of polyvinylchloride were mixed with 60 parts by weight of the above prepared plasticizer composition using a Mathis mixer to prepare plastisol.

Examples 2 to 7

A plasticizer composition was prepared by mixing compounds as described in the following Table 1 in the contents described therein.

Plastisol was prepared by the same method as Example 1, except that the above prepared plasticizer composition was used.

Comparative Example 1

As described in the following Table 1, based on 100 parts by weight of a plasticizer composition, 80 parts by weight DOTP and 20 parts by weight of TBC were mixed to prepare a plasticizer composition.

Plastisol was prepared by the same method as Example 1, except that the above prepared plasticizer composition was used.

Comparative Example 2

As described in the following Table 1, plastisol was prepared by the same method as Example 1, except that DOTP was used alone as a plasticizer.

Comparative Examples 3 to 10

A plasticizer composition was prepared by mixing compounds as described in the following Table 1 in the contents described therein.

Plastisol was prepared by the same method as Example 1, except that the above prepared plasticizer composition was used.

Experimental Example

For the plasticizer compositions and plastisols prepared in Examples and Comparative Examples, heating loss of the plasticizer composition, and initial viscosity, rate of viscosity change over time after one day, gelling speed, and migration resistance of plastisol were evaluated as follows, and the results were shown in Table 1.
(1) Heating Loss
30 g of each plasticizer composition prepared in Examples and Comparative Examples was stored in 200° C.

oven for 1 hour, and then, heating loss was calculated from the weight change according to the following Mathematical Formula 1

Heating loss (%)=[(weight of initial plasticizer composition−weight of plasticizer composition after storage at 200° C. for 1 hour)/weight of initial plasticizer composition]×100   [Mathematical Formula 1]

In this experiment, the initial weight of the plasticizer composition was 30 g.

(2) Initial Viscosity, and Rate of Viscosity Change Over Time After One Day

The initial viscosity was measured using a Brookfield viscometer (spindle #4, 20 RPM), after aging each plastisol prepared in Example and Comparative Example in a 25° C. constant temperature oven for 1 hour.

And, viscosity changed after one day had elapsed (viscosity after one day) was measured under the same conditions, and a rate of viscosity change over time was calculated according to the following Mathematical Formula 2.

Rate of viscosity change over time after one day=viscosity after one day/initial viscosity   [Mathematical Formula 1]

(3) Gelling Speed

A gelling speed of each plastisol prepared in Example and Comparative Example was measured at 110° C. using SVNC (Scanning vibrating needle curemeter). As gelling of plastisol progresses in the SVCN equipment, the amplitude of a needle in the sol decreases, and from the decrease trend, a gelling speed was scored from the lowest score 1 to the highest score 5 and evaluated (5(very excellent)>4>3(good)>2>1(very inferior).

(4) Migration Resistance

A sheet of each plastisol prepared in Example and Comparative Example was prepared using a Mathis oven. Each prepared sheet was covered with an oil paper, and a 5 kg weight was put thereon, and then, it was stored at 60° C. for 7 days. And then, the weight of the sheet was measured, and from a difference from the weight of the sheet before test, the weight of liquid material migrating from the sheet to the oil paper was confirmed. A larger difference from the weight of the sheet before test, namely, the heavier weight of liquid material migrating to the oil paper means that migration resistance is inferior. The result was scored from the lowest score 1 to the highest score 5, and migration resistance was evaluated (5(very excellent)>4>3(good)>2>1(very inferior)).

TABLE 1

|  | Example | | | | | | | Comparative Example | |
| --- | --- | --- | --- | --- | --- | --- | --- | --- | --- |
|  | 1 | 2 | 3 | 4 | 5 | 6 | 7 | 1 | 2 |
| DOTP | 40 | 45 | 50 | 50 | 40 | 40 | 35 | 80 | 100 |
| DEHCH | 50 | 45 | 40 | 30 | 50 | 45 | 55 | — | — |
| BEHCH | — | — | — | — | — | — | — | — | — |
| TBC | 10 | 10 | 10 | 20 | — | 15 | 10 | 20 | — |
| ATBC | — | — | — | — | 10 | — | — | — | — |
| Weight ratio of (TBC or ATBC)/DOTP | 0.25 | 0.27 | 0.2 | 0.4 | 0.25 | 0.38 | 0.29 | 0.25 | — |
| Weight ratio of DOTP/DEHCH | 0.8 | 1 | 1.25 | 1.67 | 0.8 | 0.88 | 0.64 | — | — |
| Weight ratio of DEHCH/(TBC or ATBC) | 5 | 4.5 | 4 | 1.5 | 5 | 3 | 5.5 | — | — |
| initial viscosity (cps) | 2,750 | 2,800 | 2,850 | 3,700 | 2,550 | 3,175 | 2,700 | 4,000 | 2,500 |
| Rate of viscosity change over time after one day | 1.37 | 1.36 | 1.37 | 1.53 | 1.25 | 1.51 | 1.38 | 1.68 | 1.05 |
| Gelling speed | 3.3 | 3.2 | 3.2 | 3.2 | 3.27 | 3.35 | 3.4 | 2.6 | 2 |
| Migration resistance | 3.3 | 3.2 | 3.2 | 3.2 | 3.25 | 3.35 | 3.38 | 2.59 | 1.9 |
| Heating loss (%) | 2.25 | 2.20 | 2.14 | 3.13 | 2.06 | 2.65 | 2.31 | 2.9 | 0.6 |

|  | Comparative Example | | | | | | | |
| --- | --- | --- | --- | --- | --- | --- | --- | --- |
|  | 3 | 4 | 5 | 6 | 7 | 8 | 9 | 10 |
| DOTP | 40 | 30 | 40 | 50 | 40 | 55 | 80 | — |
| DEHCH | 40 | 50 | — | 45 | 35 | 25 | 20 | 80 |
| BEHCH | — | — | 50 | — | — | — | — | — |
| TBC | 20 | 20 | 10 | 5 | 25 | 20, | — | 20 |
| ATBC | — | — | — | — | — | — | — | — |
| Weight ratio of (TBC or ATBC)/DOTP | 0.5 | 0.67 | 0.25 | 0.1 | 0.63 | 0.36 | — | — |
| Weight ratio of DOTP/DEHCH | 1 | 1.5 | 0.8 | 1.11 | 1.14 | 2.2 | 4 | — |
| Weight ratio of DEHCH/(TBC or ATBC) | 2 | 2.5 | 5 | 9 | 1.4 | 1.25 | — | 4 |
| initial viscosity (cps) | 3,600 | 3,510 | 2,820 | 2,420 | 4,020 | 3,800 | 2,300 | 3,200 |
| Rate of viscosity change over time after one day | 1.69 | 1.69 | 1.94 | 1.2 | 1.84 | 1.7 | 1.1 | 1.69 |

TABLE 1-continued

| | | | | | | | | |
|---|---|---|---|---|---|---|---|---|
| Gelling speed | 3.4 | 3.6 | 3.5 | 3.0 | 3.45 | 3.1 | 2.4 | 4.2 |
| Migration resistance | 3.4 | 3.6 | 3.4 | 3.0 | 3.43 | 3.1 | 2.4 | 4.17 |
| Heating loss (%) | 3.24 | 3.35 | 3.1 | 1.65 | 3.74 | 3.08 | 0.82 | 3.68 |

In the Table 1, the unit of amount of each material used is parts by weight, based on 100 parts by weight of a plasticizer composition.

Referring to Table 1, in the case of the plasticizer compositions of Examples 1 to 7 wherein DOTP, DEHCH and TBC were mixed such that optimum content ranges were met, low viscosity and decreased viscosity change rate over time of plastisol, gelling speed, migration resistance and heating loss were improved with good balance.

Meanwhile, in the case of Comparative Example 1 wherein only DOTP and TBC were used, compared to Examples, initial viscosity was higher, a rate of viscosity change over time was about 1.7 times larger, and gelling speed and migration resistance were deteriorated.

And, in the case of Comparative Example 2 wherein only DOTP was used, initial viscosity, a rate of viscosity change over time, and heating loss were improved, but gelling speed and migration resistance were significantly deteriorated.

And, in the case of Comparative Example 3 wherein DOTP, DEHCH and TBC were included such that each content range was met but the weight ratio of TBC/DOTP was as high as 0.5, Comparative Example 4 wherein DOTP, DEHCH and TBC were included but the content of DOTP was low, and thus, the weight ratio of TBC/DOTP was as high as 0.65, and Comparative Example 5 wherein BEHCH was included instead of DEHCH in Example 1, gelling seed and migration resistance were improved, but a rate of viscosity change over time and heating loss significantly increased.

And, in the case of Comparative Example 6 wherein DOTP, DEHCH and TBC were included but the content of TBC was too small, and thus, the weight ratio of TBC/DOTP was low, low initial viscosity, and decreased viscosity change rate over time and heating loss were exhibited, but gelling speed and migration resistance were deteriorated, and to the contrary, in the case of Comparative Example 7 wherein the content of TBC was too high, gelling speed and migration resistance were excellent, but initial viscosity, viscosity change rate over time, and heating loss significantly increased.

And, in the case of Comparative Example 8 wherein DOTP, DEHCH and TBC were included, but the content of DEHCH was such low that the content range of DEHCH of the invention was not met, initial viscosity and viscosity change rate over time increased, and heating loss was also large.

And, in the case of Comparative Example 9 wherein TBC was not included, and the content of DOTP was too high as compared to DEHCH, initial viscosity, viscosity change rate over time and heating loss were improved, but gelling speed and migration resistance were significantly deteriorated.

And, in the case of Comparative Example 10 wherein DOTP was not included and the content of DEHCH was too high as compared to TBC, most excellent improvement effect was exhibited in terms of gelling speed and migration resistance, but viscosity change rate over time was large, and heating loss significantly increased.

From the results, it can be seen that when DOTP, DEHCH and TBC were included in optimum content ranges and ratios, low viscosity and decreased viscosity change rate over time of plastisol, and improvement in gelling speed, migration resistance and heating loss were realized with good balance.

The invention claimed is:

1. A plasticizer composition comprising, based on 100 parts by weight of the plasticizer composition,
   35 to 50 parts by weight of a terephthalate-based compound represented by the following Chemical Formula 1,
   30 to 55 parts by weight of a cyclohexane dicarboxylate-based compound represented by the following Chemical Formula 2, and
   8 to 20 parts by weight of a citrate-based compound represented by the following Chemical Formula 3,
   wherein the weight ratio of the citrate-based compound to the terephthalate-based compound is 0.2 to 0.4,
   wherein the weight ratio of the cyclohexane dicarboxylate-based compound to the citrate-based compound is 4 to 5.5,
   wherein the weight ratio of the terephthalate-based compound to the cyclohexane dicarboxylate-based compound is 0.64 to 1.5, and
   wherein heating loss calculated by the following Mathematical Formula 1 is 2.5% or less:

[Chemical Formula 1]

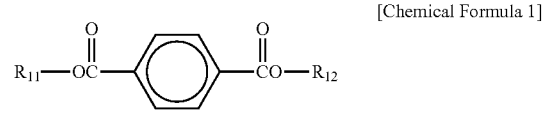

in the Chemical Formula 1,
$R_{11}$ and $R_{12}$ are identical to each other, and C4-10 alkyl,

[Chemical Formula 2]

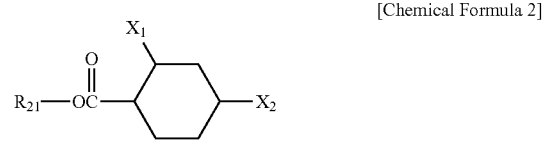

in the Chemical Formula 2,
$X_1$ and $X_2$ are each independently, hydrogen or —C(=O)O—$R_{22}$, provided that both $X_1$ and $X_2$ are not hydrogen, and
$R_{21}$ and $R_{22}$ are identical to each other, and C4-10 alkyl,

[Chemical Formula 3]

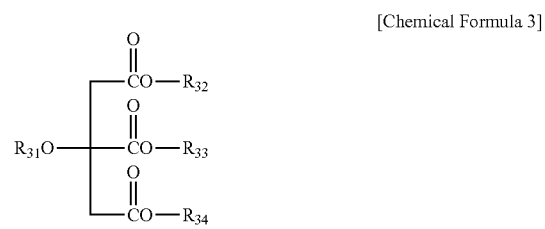

in the Chemical Formula 3, $R_{31}$ is hydrogen or acetyl, $R_{32}$ to $R_{34}$ are each independently, C4-10 alkyl, Heating loss (%)=[(weight of initial plasticizer composition-weight of plasticizer composition after storage at 200° C. for 1 hour)/weight of initial plasticizer composition]×100.   [Mathematical Formula 1]

2. The plasticizer composition according to claim 1, wherein the weight ratio of the citrate-based compound to the terephthalate-based compound is 0.2 to 0.3.

3. The plasticizer composition according to claim 1, wherein the weight ratio of the cyclohexane dicarboxylate-based compound to the citrate-based compound is 4 to 5.

4. The plasticizer composition according to claim 1, wherein the terephthalate-based compound is dioctyl terephthalate, dibutyl terephthalate or diisononyl terephthalate.

5. The plasticizer composition according to claim 1, wherein the cyclohexane dicarboxylate-based compound is di(2-ethylhexyl)cyclohexane-1,4-dicarboxylate, diisononylcyclohexane-1,2-dicarboxylate, di(2-ethylhexyl)cyclohexane-1,2-dicarboxylate, or dibutylcyclohexane-1,2-dicarboxylate.

6. The plasticizer composition according to claim 1, wherein the citrate-based compound is tributyl citrate, acetyltributyl citrate, triethylhexyl citrate, acetyl triethylhexyl citrate, or triisononyl citrate.

7. The plasticizer composition according to claim 1, wherein, the plasticizer composition comprises, based on 100 parts by weight of the plasticizer composition,
- 35 to 50 parts by weight of dioctyl terephthalate as the terephthalate-based compound,
- 30 to 55 parts by weight of di(2-ethylhexyl)cyclohexane-1,4-dicarboxylate as the cyclohexane dicarboxylate-based compound, and
- 10 to 20 parts by weight of tributyl citrate as the citrate-based compound,
- wherein the weight ratio of the citrate-based compound to the terephthalate-based compound is 0.2 to 0.3,
- the weight ratio of the terephthalate-based compound to the cyclohexane dicarboxylate-based compound is 0.64 to 1.5, and
- the weight ratio of the cyclohexane dicarboxylate-based compound to the citrate-based compound is 4 to 5.5.

8. A vinylchloride resin composition comprising vinylchloride resin, and the plasticizer composition according to claim 1.

9. The vinylchloride resin composition according to claim 8, wherein vinylchloride resin composition comprises the plasticizer composition in an amount of 30 to 200 parts by weight, based on 100 parts by weight of the vinylchloride resin.

10. The vinylchloride resin composition according to claim 8, wherein vinylchloride resin composition further comprises a stabilizer, a blowing agent, a filler, a viscosity depressant, a diluent, a dispersant, titanium dioxide or a mixture thereof.

11. The vinylchloride resin composition according to claim 8, wherein initial viscosity of the vinylchloride resin composition, measured under conditions of spindle #4 and 20 RPM using a Brookfield viscometer, after aging under 25° C. constant temperature condition for 1 hour, is 2000 to 4000 cps; and a rate of viscosity change over time, calculated by the following Mathematical Formula 2, is 1 to 1.55:

Rate of viscosity change over time after one day=viscosity after one day/initial viscosity   [Mathematical Formula 2]

in the Mathematical Formula 2, the initial viscosity is viscosity measured under conditions of spindle #4 and 20 RPM using a Brookfield viscometer, after aging under 25° C. constant temperature condition for 1 hour, and the viscosity after one day is viscosity measured after one day has elapsed under the same conditions.

12. A molded article comprising the vinylchloride resin composition of claim 8.

13. The molded article according to claim 12, wherein the molded article is a wallpaper, flooring, mat, tarpaulin, sealant, artificial leather, toy or coating material of the lower part of automobiles.

* * * * *